United States Patent [19]

Jaskie et al.

[11] Patent Number: 5,698,941
[45] Date of Patent: Dec. 16, 1997

[54] OPTICAL CORRECTION LAYER FOR A LIGHT EMITTING APPARATUS

[75] Inventors: James E. Jaskie; Lawrence N. Dworsky, both of Scottsdale; Karen E. Jachimowicz, Laveen; Fred V. Richard, Scottsdale; Kathleen Tobin, Tempe, all of Ariz.

[73] Assignee: Motorola, Schaumburg, Ill.

[21] Appl. No.: 585,089

[22] Filed: Jan. 16, 1996

[51] Int. Cl.$^6$ .................... F21V 7/00; H01J 5/16; H01K 1/26
[52] U.S. Cl. .................... 313/494; 313/113; 313/478; 362/302; 362/298
[58] Field of Search ............... 313/494, 495, 313/497, 482, 422, 478, 479, 110, 111, 116, 113, 114; 362/298, 302; 359/729, 731

[56] References Cited

U.S. PATENT DOCUMENTS

| | | |
|---|---|---|
| 4,622,492 | 11/1986 | Barten . |
| 4,688,904 | 8/1987 | Hirose et al. ............... 359/729 |
| 5,130,614 | 7/1992 | Staelin . |
| 5,182,489 | 1/1993 | Sano ............................ 313/113 |
| 5,233,262 | 8/1993 | Lynn et al. .................. 313/113 |
| 5,418,420 | 5/1995 | Roberts ........................ 362/302 |
| 5,541,479 | 7/1996 | Nagakubo .................... 313/587 |

OTHER PUBLICATIONS

Gerard A. Alphonse et al., "Psychophysical Requirements for Tiled Large Screen Displays", SPIE vol. 1664 High–Resolution Displays and Projection Systems (1992) pp. 230–240.

Adi Abileah et al., "Optical Tiled AMLCD for Very Large Display Applications", SPIE vol. 1664 High–Resolution Displays and Projections Systems (1992) pp. 241–244.

Primary Examiner—Sandra L. O'Shea
Assistant Examiner—Joseph Williams
Attorney, Agent, or Firm—Eugene A. Parsons

[57] ABSTRACT

An optical correction layer for a light emitting apparatus having gaps in brightness at the light-emitting surface. The optical correction layer includes a plurality of optical correction regions centered over the gaps, and a plurality of optically transparent regions which overlay the remainder of the light-emitting surface. The optical correction regions include appropriately formed grooves which collect and redirect light adjacent the gap. The light is redirected to cover and effectively conceal the gap. The optically transparent regions permit light to travel through, without redirection.

34 Claims, 12 Drawing Sheets

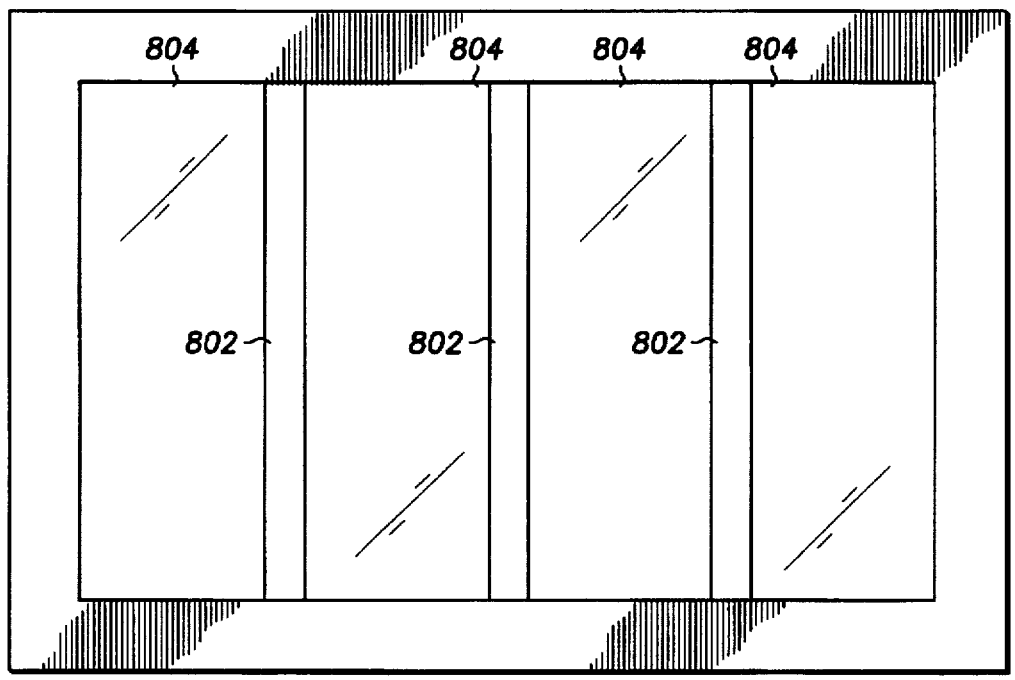
FIG. 10  800
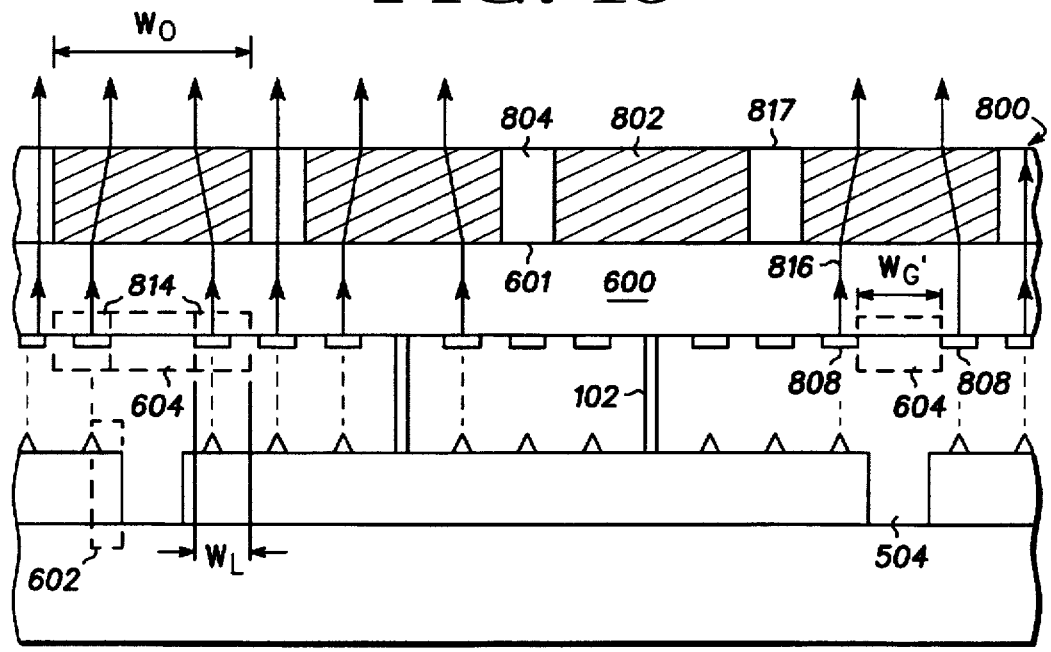
500  FIG. 11

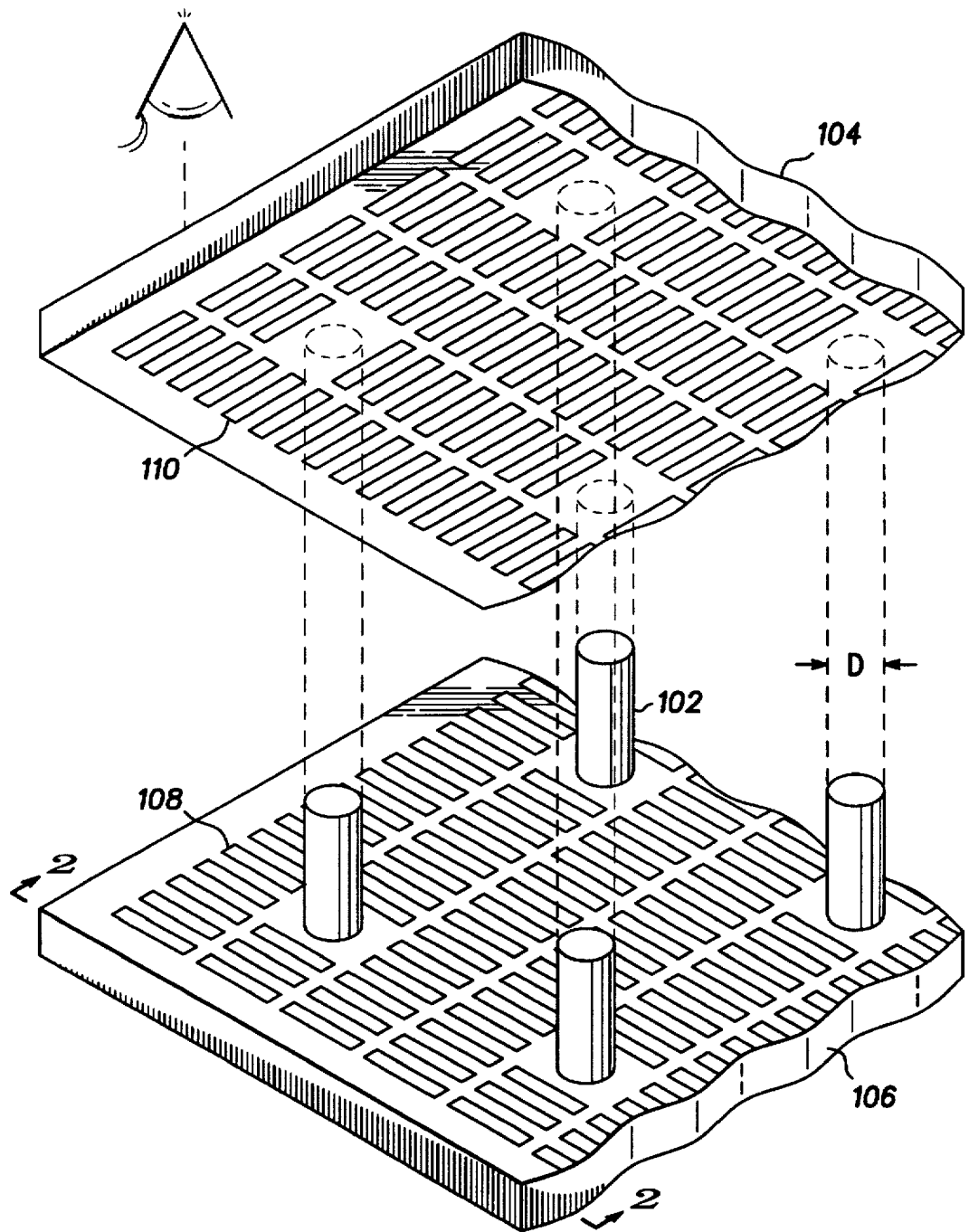
<u>100</u> *FIG. 13*

OPTICAL CORRECTION LAYER FOR A LIGHT EMITTING APPARATUS

FIELD OF THE INVENTION

The present invention pertains to the area of flat panel displays and more specifically to the concealment of gaps in the image brightness of a field emission display due to, for example, the presence of spacers which are incorporated to prevent the implosion of the display when evacuated, or due to the gaps between individual emitter cathode plates which are tiled together to form a large screen (a diagonal of one or more meters) display.

BACKGROUND OF THE INVENTION

Certain structural requirements of flat panel displays, backlighting lamps for liquid crystal displays, and other light-emitting apparati can result in gaps in brightness of the emitted light over the emission area of the light-emitting apparatus. For example, field emission displays and backlighting lamps for liquid crystal displays require spacers to maintain a nominal spacing between the faceplate and backplate. In a field emission display, these spacers are positioned between the plates of the display, in the electron emission region. An example of a spacer for field emission displays is described in co-pending U.S. patent application Ser. No. 08/168,301, entitled "Field Emission Display Employing a Peripheral Diamond Material Edge Electron Emitter", by Wiemann, et al, filed Dec. 17, 1993. Due to the finite thickness of the spacer and due to tolerance requirements, gaps are formed between the cathodoluminescent material of the faceplate so that the spacers can make physical contact with the faceplate and provide a load-bearing surface. Methods of avoiding the formation of gaps are known in the art. All of these known techniques require costly, complex modifications of the display which may additionally compromise the mechanical integrity of the faceplate or the spacer.

Additionally, large-screen flat panel displays, having a diagonal of one or more meters, are known in the art. The continuous, large display is formed by tiling together a plurality of smaller displays. Most displays have an edge between the viewing area and the mechanical outside frame. This edge results in a gap between the images of the smaller displays comprising the large, tiled display. Some methods are known for concealing these gaps. However, these methods require the alteration of the faceplates of the smaller display. These methods can result in loss of resolution, decreased transmission of light, and incompatibility with final packaging steps of the display.

Accordingly, there exists a need for a method of eliminating visual gaps in flat panel displays which overcomes at least some of these shortcomings of the prior art.

It is one purpose of the present invention to provide a means of eliminating gaps in brightness in a light-emitting apparatus which does not require modification of the existing fabrication processes of the apparatus.

It is another purpose of the present invention to provide a means of eliminating gaps in brightness in a light-emitting apparatus which is simple and economical to fabricate and use.

It is another purpose of the present invention to provide a means of eliminating gaps in brightness in a light-emitting apparatus which does not compromise the mechanical integrity of the faceplate and/or spacers.

SUMMARY

The above need and others are substantially met through the provision of an optical correction layer for concealing gap(s) in brightness at a light-emitting surface of a faceplate of a light-emitting apparatus. The light-emitting apparatus has light-emitting regions which are located adjacent the gap(s) in brightness and which provide the light for concealing the gap(s) in brightness. The optical correction layer having features of the present invention comprises at least one optical correction region that is substantially centered over the gap(s) and are positioned opposite the gap(s) and the light-emitting regions adjacent the gap(s). The optical correction layer further includes a means for redirecting light disposed within the optical correction region(s) so that the light emitted by the light-emitting regions is received by, and redirected by, the light-redirecting means to substantially cover the gap(s). The optical correction layer further includes a plurality of optically transparent regions. The optical correction regions(s) is/are formed between the plurality of optically transparent regions to form a continuous layer of substantially uniform height. The continuous layer has two opposed, planar surfaces. One of the planar surfaces is affixed to the light-emitting surface of the light-emitting apparatus so that the optical correction region(s) is/are substantially centered over the gap(s) in brightness. The optical correction layer provides substantially uniform brightness over the light-emitting apparatus and substantially conceals the gap(s) in brightness.

BRIEF DESCRIPTION OF THE DRAWINGS

Referring to the drawings:

FIG. 10 is a schematic, top plan view of an embodiment of an optical correction layer in accordance with the present invention.

FIG. 11 is a simplified, schematic, side elevational view of an optical correction layer applied to a large-screen field emission display, as depicted in FIG. 6, in accordance with the present invention.

FIG. 13 is a view, similar to FIG. 1, of a field emission display having spacers which include posts.

DESCRIPTION OF THE PREFERRED EMBODIMENTS

Figure 1:
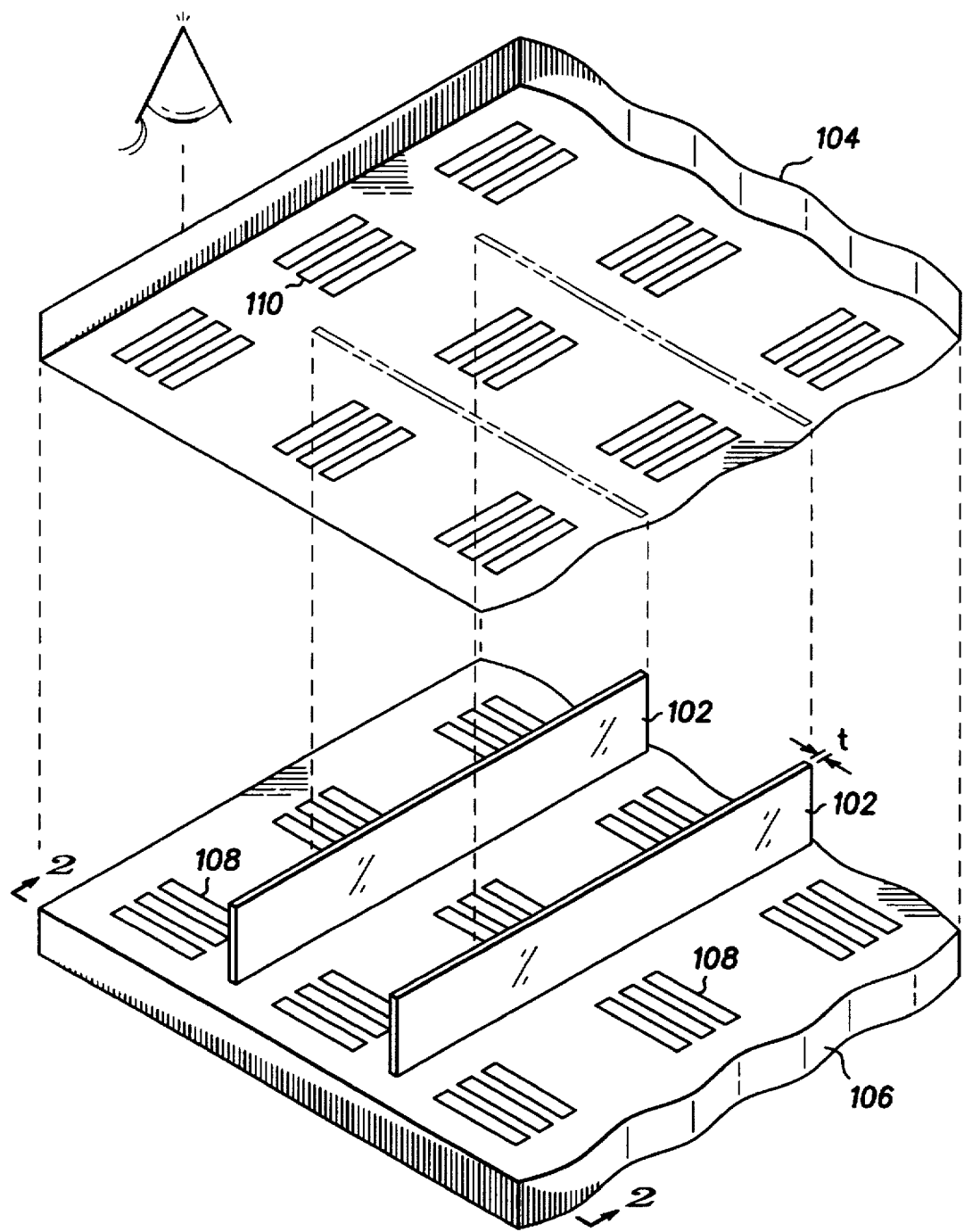
FIG. 1 is a simplified, expanded view of a field emission display having spacer bars.

Referring now to FIG. 1, there is depicted a simplified, expanded view of a field emission display 100 having a plurality of spacers 102. Display 100 includes a faceplate 104 and a cathode structure 106. A plurality of pixels 108 of field emitters, which emit electrons, are formed on the surface of cathode structure 106. A plurality of phosphor dots 110 are formed on faceplate 104 to receive the electrons and emit light to create a visual image. An example of spacers for field emission displays are described in the co-pending application entitled "Flat Panel Display Spacer Structure" which was submitted to the Patent and Trademark Office on Dec. 13, 1995, bearing the attorney docket number CR95-112 and assigned to the same assignee and which application is incorporated herein by reference. Spacers 102 provide structural support to prevent the collapse of display 100 when evacuated. Spacer bars 102 have opposed edges which are in abutting engagement with faceplate 104 and cathode structure 106. Fabrication and handling requirements, as well as the load-bearing requirements, of spacer bars 102 determine the thickness, t, of spacer bars 102. The required distance between phosphor dots 110, at the locations where spacer bars 102 will be positioned, is determined by this predetermined, finite thickness of spacer bars 102 and, in addition, by the practical tolerance requirements which allow for slight errors in placement alignment.

Figure 2:
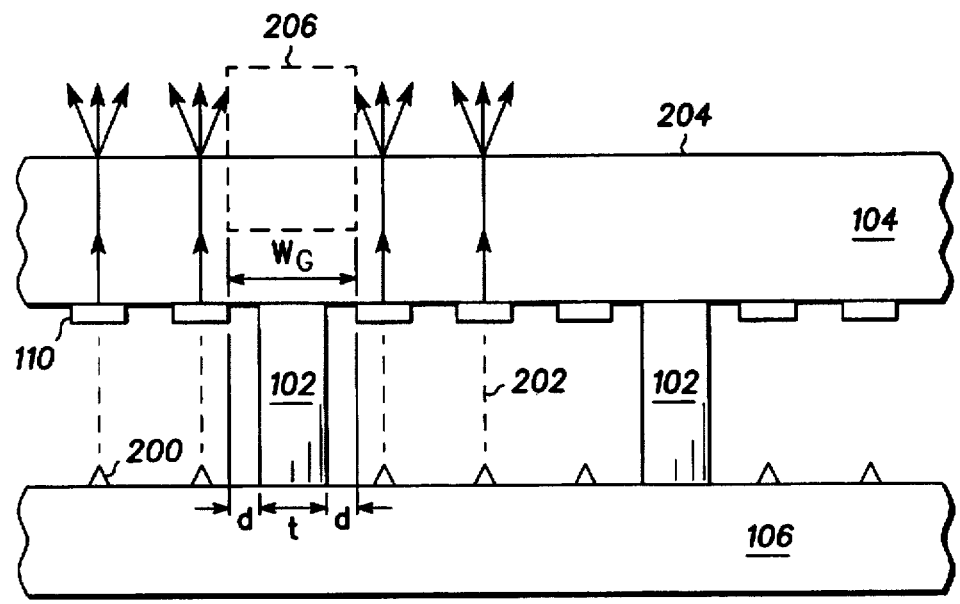
FIG. 2 is a side-elevational, unexpanded view of the field emission display, taken along the line 2—2 of FIG. 1.

Referring now to FIG. 2 there is depicted a side-elevational, unexpanded view of display 100, taken along the line 2—2 of FIG. 1. A plurality of field emitters 200 emit a plurality of electrons 202 which traverse the distance between the inner surfaces of faceplate 104 and cathode structure 106. Electrons 202 then impact phosphor dots 110, causing the phosphor material to emit light, depicted by arrows traversing faceplate 104. The light is then scattered at a diffusive, light-emitting surface 204 of faceplate 104. A gap 206 in the light, or visual image, is delineated generally within a depicted dashed line box. The width, $w_G$, of gap 206 is generally equal to the sum of the thickness, t, of spacer 102 and the tolerances, $2d$, on either side of spacer 102. The width, $w_G$, of gap 206 can be great enough that it is visually discernible by the human eye. Gap 206 will be visually discernible if its width, $w_G$, is greater than, or equal to, approximately 250 micrometers.

Figure 3:
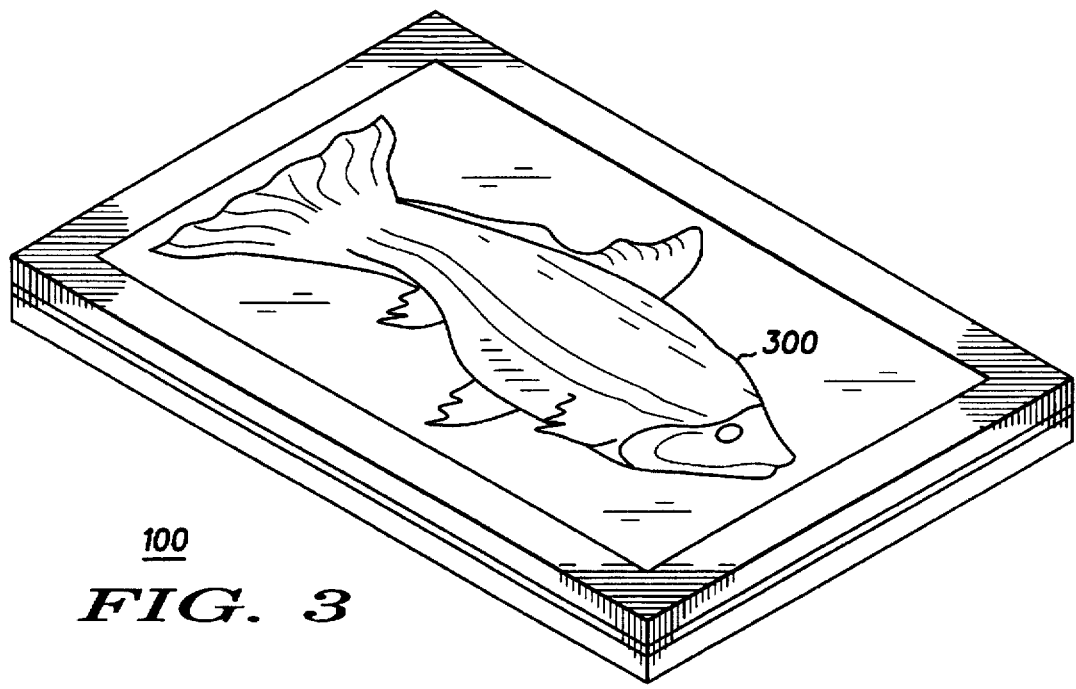
FIG. 3 is an isometric view of a flat panel display having a visual image without gaps.
Figure 4:
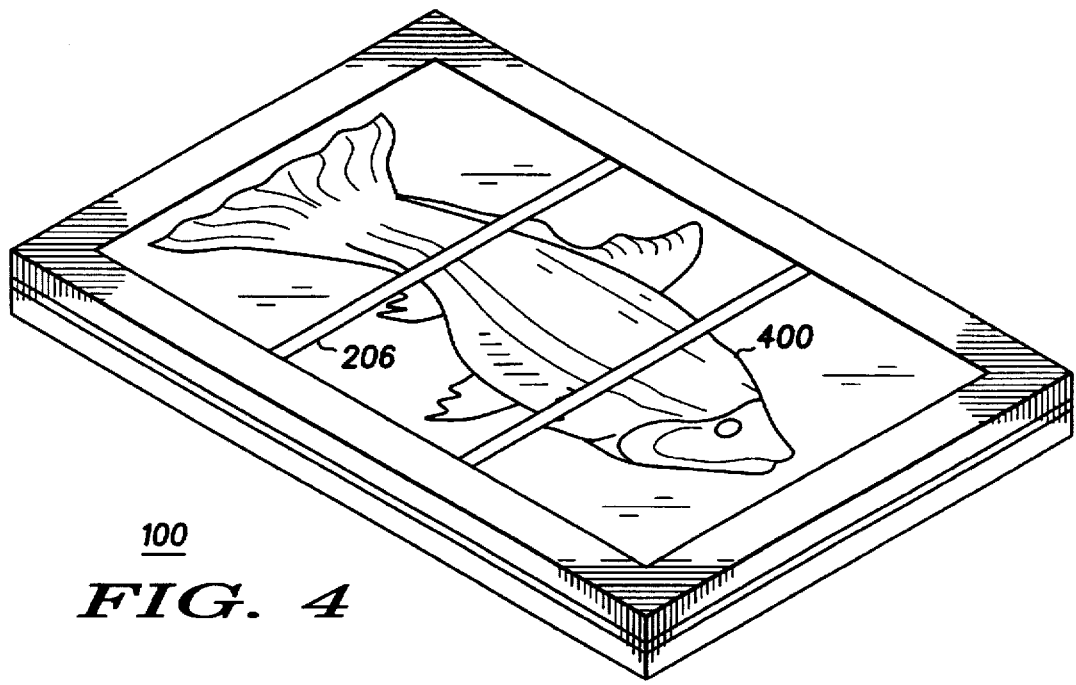
FIG. 4 is an isometric view of a field emission display, similar to FIG. 3, having a visual image with gaps due to spacers.

Referring now to FIGS. 3 and 4 there are depicted visual images on operating field emission display 100. An image 300 in FIG. 3 is the ideal image, without gaps. Illustrated in FIG. 4 is field emission display 100 having an image 400 which is similar to image 300 of FIG. 3; however, image 400 is disrupted by gaps 206 which are due to the use of spacers 102.

Figure 5:
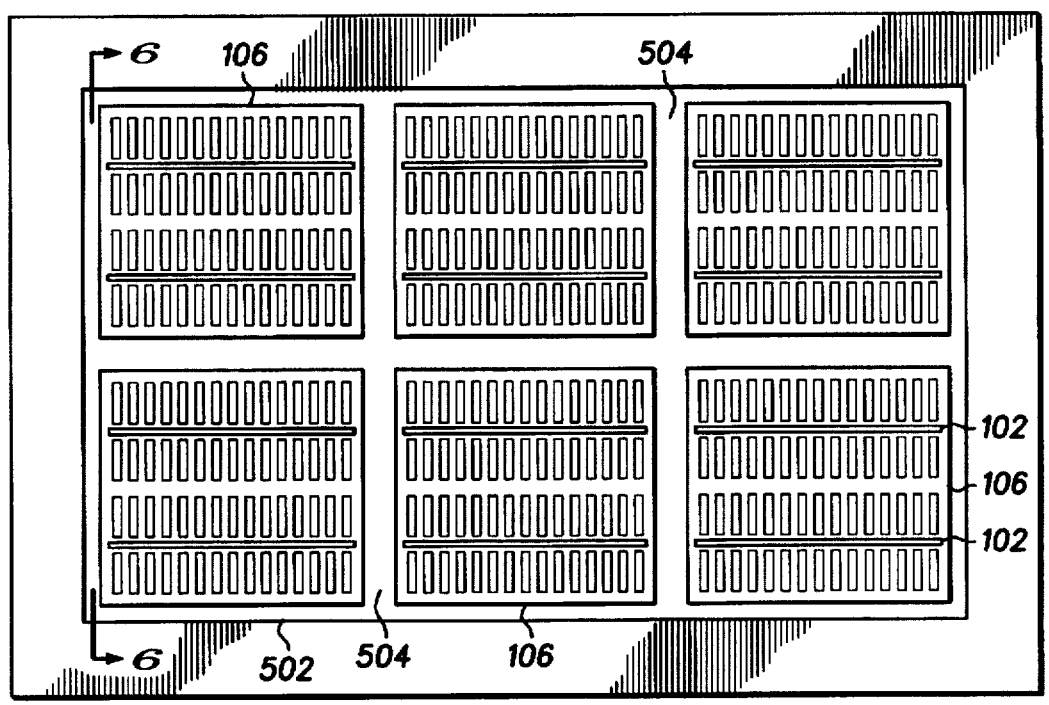
FIG. 5 is a simplified top plan view of a large screen, tiled field emission display, without a faceplate.

Referring now to FIG. 5 there is depicted a simplified, top plan view of a large screen field emission display 500, the faceplate not being shown. Large screen display 500 has a diagonal length of about one meter and is formed by tiling together a plurality of cathode structures 106 on a common backplate 502. Spacers 102 are positioned upon each cathode structure 106, as described in the discussions of FIGS. 1–4. A large, continuous faceplate, not shown, is positioned in abutting engagement with all spacers 102. When cathode structures 106 are tiled together, a tolerance gap 504 exists between adjacent structures 106. These tolerance gaps 504 can contribute to visual gaps, or gaps in brightness, in the display image.

Figure 6:
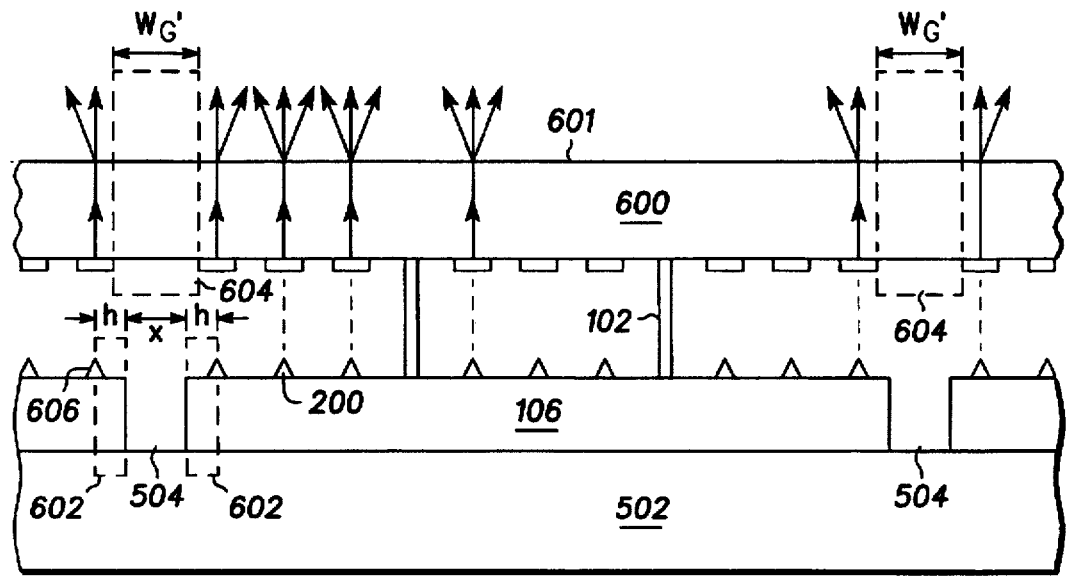
FIG. 6 is a side elevational view of a large screen field emission display, taken along the line 6—6 of FIG. 5 and further depicting a faceplate.

Referring now to FIG. 6 there is depicted a side-elevational view of large screen field emission display 500 taken along the line 6—6 of FIG. 5 and further depicting a faceplate 600 being positioned in abutting engagement with spacers 102 and parallel with backplate 502. Faceplate 600 includes a light-emitting surface 601. Each cathode structure 106 includes a plurality of handling edges 602, each of which is delineated generally within a depicted dashed line boxes. Handling edges 602 are located along the perimeter of structure 106. Edges 602 provide structure for the handling of cathode structure 106 during the processing and placement steps in the fabrication of display 500. Edges 602 are also utilized to provide the necessary electronic connections to operate the field emitters. Tolerance gap 504 between adjacent structures 106, and edges 602 of adjacent structures 106, contribute to the formation of a tiling gap 604, delineated generally within a depicted dashed line box, in the image produced by display 500. Because no emitters exist on edges 602 or within tolerance gap 504, no electrons can be emitted within these regions to contribute to image formation. Tiling gap 604 has a width, $w_G'$, equal to the sum of the width, x, of tolerance gap 504 and the widths, $2h$, of two adjacent handling edges 602.

Figure 7:
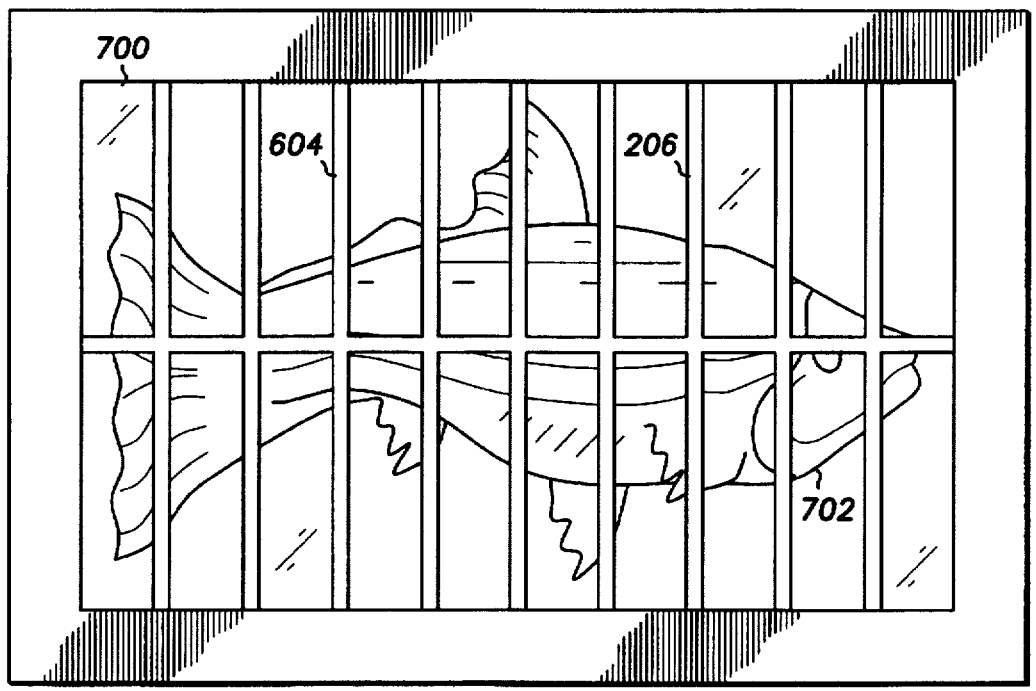
FIG. 7 is a top plan view of a large screen, field emission display having a visual image with gaps due to spacers and tiling.

Illustrated in FIG. 7 is a top plan view of large screen, field emission display 500 further including a faceplate 700. Display 500 is operating and produces a visual image 702 with gaps 206, 604 due to spacers and tiling, respectively.

Figure 8:
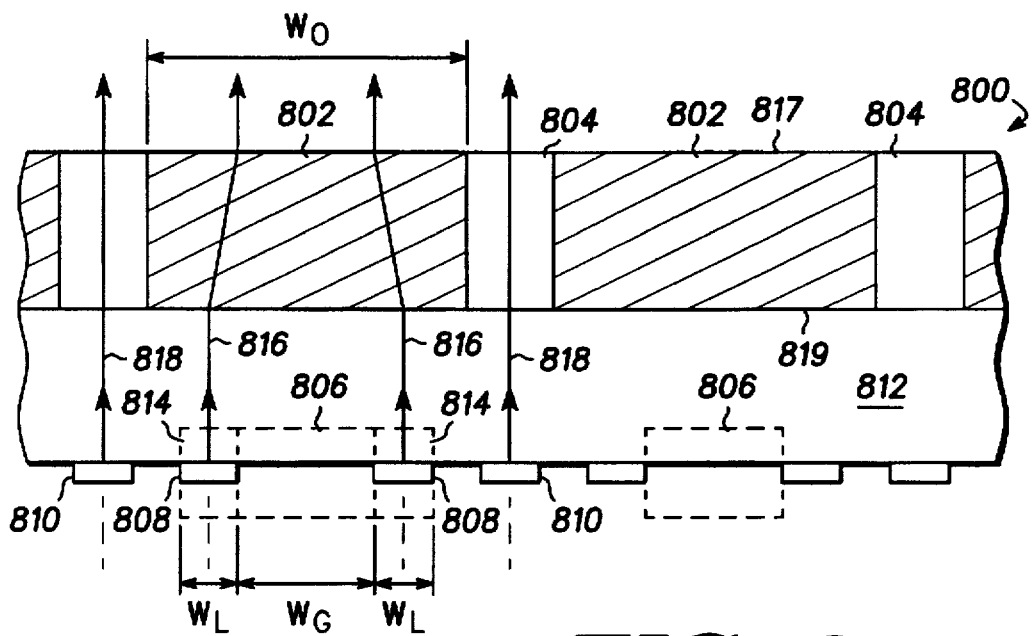
FIG. 8 is a cross-sectional view of a faceplate for a field emission display having an optical correction layer affixed thereon in accordance with the present invention.

Referring now to FIG. 8, there is depicted a side-elevational view of a schematic representation of an optical correction layer 800 in accordance with the present invention. FIG. 8 illustrates the general principle and is included to aid understanding. Optical correction layer 800 includes a plurality of optical correction regions 802 and a plurality of optically transparent regions 804 which comprise a continuous layer of substantially uniform height. The continuous layer has two opposed, planar surfaces: an outer surface 817 and an inner surface 819. In this specific embodiment, outer surface 817 is not a light-diffusing surface. In other embodiments of the present invention the outer surface of the optical correction layer includes a light-diffusing surface. Inner surface 819 is affixed to the light-emitting surface of a faceplate 812. Optical correction region 802 overlays and is substantially centered over a gap 806 in brightness, delineated generally within a depicted dashed line box. Optical correction region 802 also overlays light-emitting regions 814, which, in this particular application, include gap-adjacent phosphor dots 808, which are adjacent gap 806. Light-emitting regions 814 provide the light which is collected and redirected to conceal gap 806. The width, $w_L$, of light-emitting regions 814 is equal to the width of gap-adjacent phosphor dots 808, which is on the order of 150 micrometers. Optical correction region 802 is formed and positioned to receive the light 816 emitted by light-emitting regions 814 adjacent gap 806. Thus, the width, $w_O$, of optical correction region 802 is equal to the sum of the width of gap 806 and light-emitting regions 814, or, in formula form, $w_O=w_G+2w_L$. Optical correction region 802 receives and redirects light 816 to improve the uniformity of light distribution over outer surface 817 of optical correction layer 800 and thereby effectively conceal gap 806. In this specific embodiment, the width of light-emitting regions 814 is equal to the width of one gap-adjacent phosphor dot 808 and, in general, is specified to provide sufficient light to conceal the gap in brightness and maximize the uniformity of brightness over outer surface 817.

Further illustrated in FIG. 8, plurality of optically transparent regions 804 are positioned in optical correction layer 800 so that they overlay a plurality of phosphor dots 810 which are not adjacent to gaps 806. When light is emitted from phosphor dots 810, the light traverses faceplate 812 and then travels through optically transparent region 804 without redirection. Most of light 818 which is incident on the interface between optically transparent region 804 and faceplate 812 is perpendicular to the interface. So, light 818 substantially travels through the interface without changing its direction, regardless of whether or not the indices of refraction of faceplate 812 and the plastic bulk of layer 800 are equal. The net result is the concealment of gaps and a more uniform distribution of the light emitted by the display over the external surface of the faceplate.

Figure 9:
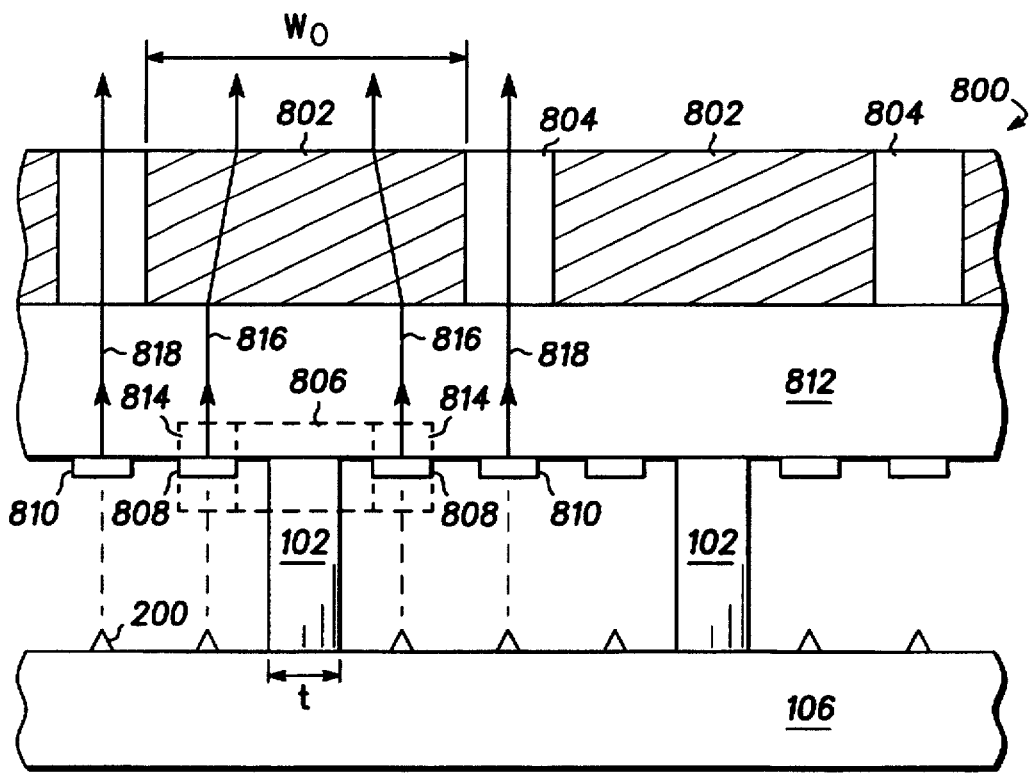
FIG. 9 is a simplified, side-elevational view of a field emission display, including the structure of FIG. 2, and an optical correction layer positioned thereon, in accordance with the present invention.

Referring now to FIG. 9, there is depicted field emission display 100, as viewed in FIG. 2, and further including optical correction layer 800, in accordance with the present invention. Optical correction regions 802 are directly opposed to, centered over, and overlapping spacers 102 and light-emitting regions 814 which are adjacent gap 806. Because, in this embodiment, spacers 102 are bars extending generally across the inner surface of cathode structure 106, optical correction regions 802 correspondingly form elongated strips, or columns, in optical correction layer 800. Gap-adjacent phosphor dots 808 are adjacent spacer 102 and form a column on each side of spacer 102. Gap-adjacent phosphor dots 808 comprise a light-emitting region 814, delineated generally within a depicted dashed line box, adjacent gap 806. The dimensions of optical correction region 802 are predetermined so that optical correction region 802 overlaps gap 806 and light-emitting regions 814. Optical correction region 802 is positioned to receive light 816 emitted by light-emitting regions 814 (emitted by gap-adjacent phosphor dots 808); it then redirects light 816 to cover spacer 102 and effectively conceal gap 806 by providing a more uniform distribution of light over faceplate 812. Light 818 which is emitted by phosphor dots 810, which are not adjacent spacers 102, travels through faceplate 812 and optically transparent regions 804, without being redirected.

Referring now to FIG. 10 there is depicted a schematic, top plan view of optical correction layer 800 which would be affixed to display 100 as depicted in FIG. 4. Optical correction regions 802 are thicker than gaps 206 in FIG. 4 and would be centered over gaps 206. Since gaps 206 form elongated strips across the faceplate of display 100, optical correction regions 802 include elongated strips. Optical correction regions 802 are embedded between optically transparent regions 804 so as to form a continuous layer of uniform thickness. Optical correction layer 800 redistributes light to provide an unbroken image, as depicted in FIG. 3.

Referring now to FIG. 11 there is depicted a simplified, schematic, side elevational view, similar to FIG. 6, of large-screen field emission display 500 further including optical correction layer 800 affixed to light-emitting surface 601 of faceplate 600. Optical correction layer 800 includes optical correction regions 802 which overlap, and are generally centered over, tiling gaps 604, delineated generally within depicted dashed line boxes. As described in detail in the explanation of FIG. 6, tiling gaps 604 are attributable to placement tolerance gaps 504 and cathode handling edges 602. Light-emission regions 814 include gap-adjacent phosphor dots 808 which are adjacent tiling gap 604. In this specific embodiment, the width, $w_O$, of optical correction region 802 is equal to the sum of the width, $w_G'$, Of tiling gap 604 (or x+2h, as shown in FIG. 6) and the widths of adjacent light-emitting regions 814, or, in formula form, $w_O=w_G'+2w_L=(X+2h)+2w_L$. The light 816 emitted by gap-adjacent phosphor dots 808 in adjacent light-emitting region 814 travels through faceplate 600 and is then received, and redirected, by optical correction region 802. Light 816, after traversing optical correction layer 800, exits through outer surface 817. Light 816 is generally uniformly distributed over the outer surface of optical correction region 802 so that gap 604 is effectively concealed. In this specific embodiment, optical correction regions 802 are provided only for tiling gaps. In FIG. 11 it is assumed that spacers 102 are thin enough so that they do not produce visually discernable gaps, and, therefore, do not require concealment. However, some, or all, of spacers 102 may have thicknesses such that they create visually discernable gaps 806, in addition to tiling gaps 604. This scenario was depicted in FIG. 5, and an embodiment of optical correction layer 800 for concealing both spacer gaps 806 and tiling gaps 604 is illustrated in FIG. 12.

Figure 12:
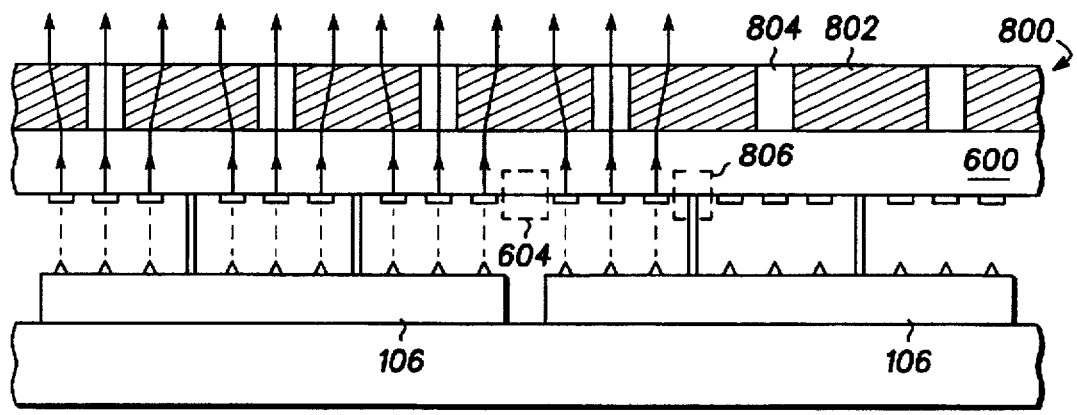
FIG. 12 is a view, similar to FIG. 11, of an optical correction layer applied to a large-screen field emission

Referring now to FIG. 12, there is depicted a view, similar to FIG. 11, of large-screen field emission display 500 further including optical correction layer 800 having optical correction regions 802 for the concealment of spacer gaps 806 and tiling gaps 604, in accordance with the present invention.

Referring now to FIG. 13 there is depicted a view, similar to FIG. 1, of field emission display 100. Spacers 102 include posts, the ends of which are in abutting engagement with faceplate 104 and cathode structure 106. The diameter, D, of spacer 102 may be great enough to produce a gap in brightness in the light emitted from display 100. A cross-sectional view taken along the line 2—2 is depicted in FIG. 2, which was described above, the dimension t now corresponding to the diameter of spacer 102. Gaps 206 are circular due to the circular shape of the cross-section of spacer 102. In this instance, the dimension $w_G$ in FIG. 2 corresponds to the diameter of circular gap 206.

Figure 14:
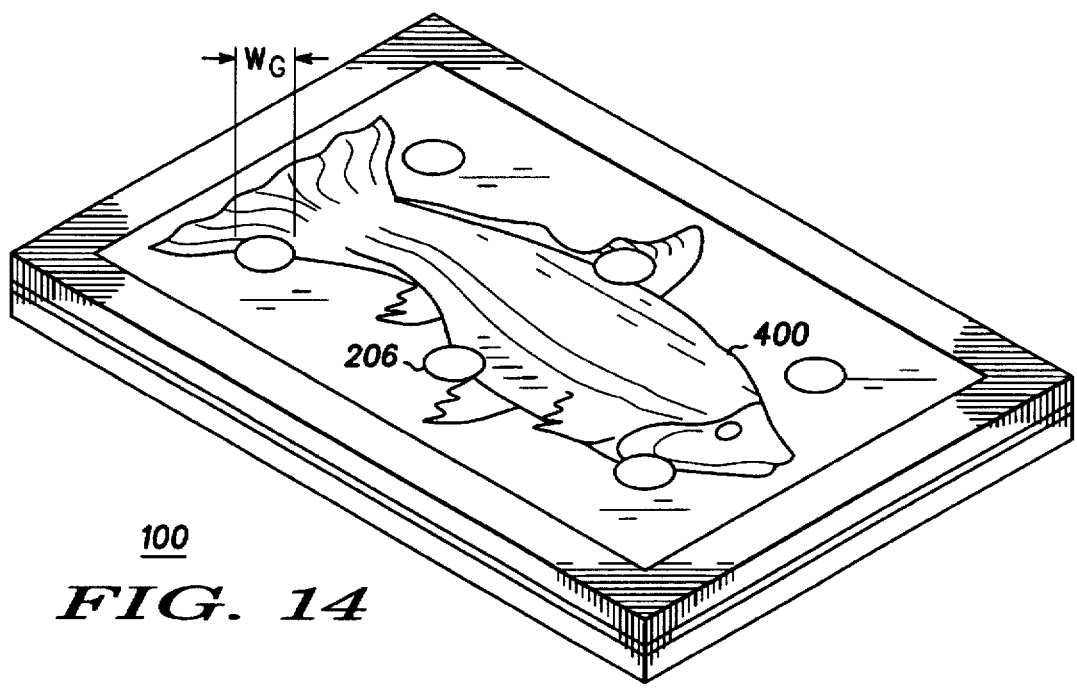
FIG. 14 is a view, similar to FIG. 4, illustrating gaps in a visual image due to the spacers of FIG. 13.

Referring now to FIG. 14, there is depicted a view, similar to FIG. 4, illustrating gaps 206 in image 400 due to spacers 102, which are posts having circular cross-sections.

Figure 15:
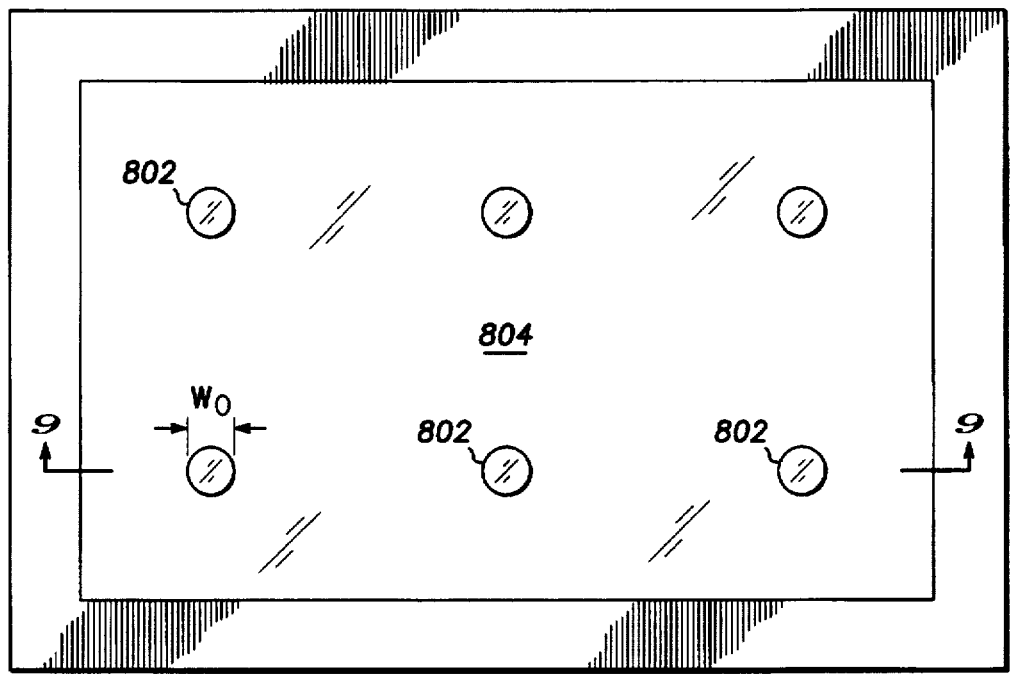
FIG. 15 is a schematic, top plan view, similar to FIG. 10, of another embodiment of an optical correction layer in accordance with the present invention.

Referring now to FIG. 15, there is depicted a top planar view of optical correction layer 800 including circular optical correction regions 802 embedded within optically tranparent region 804. When optical correction layer 800 is affixed to faceplate 104 of FIG. 2, the resulting cross-section taken along the line 9—9 of FIG. 15 is also represented by FIG. 9., the dimension t corresponding to the diameter of spacer 102 and the dimension $w_O$ corresponding to the diameter of circular optical correction region 802. In this specific embodiment the light-emitting region 814 is annular in shape because it includes gap-adjacent phosphor dots 808 which are directly adjacent to a circular gap. The general principles described in reference to FIG. 9 are also applicable to this circular geometry.

Gap geometries other than elongated strips or circles can be accomodated by the present invention by making minor changes in the structure of optical correction layer 800, which changes will be understood by those skilled in the art after reading this disclosure.

Figure 16:
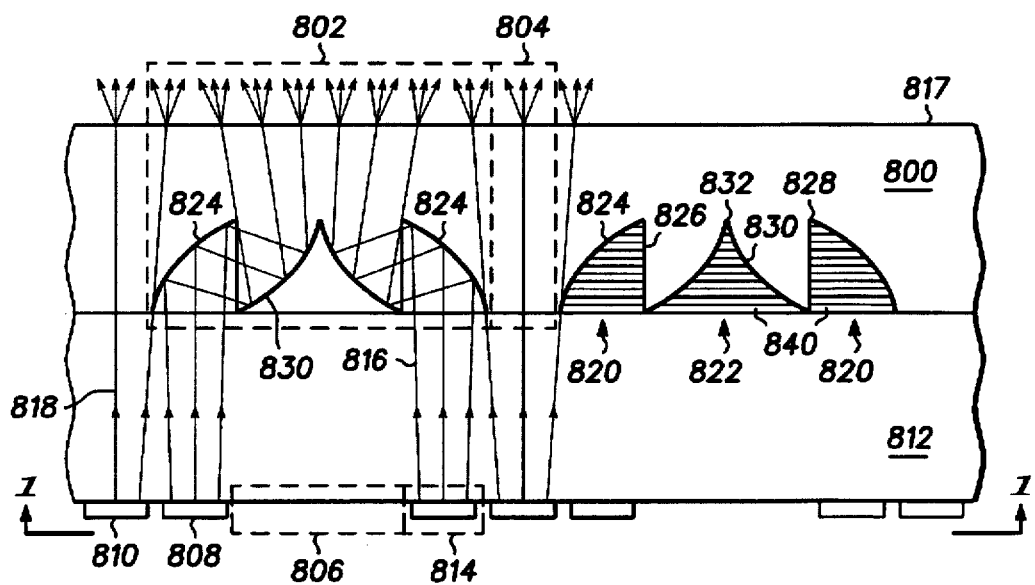
FIG. 16 is a cross-sectional view of an optical correction layer, illustrating the detailed structure and the application to the faceplate of a field emission display.
Figure 17:
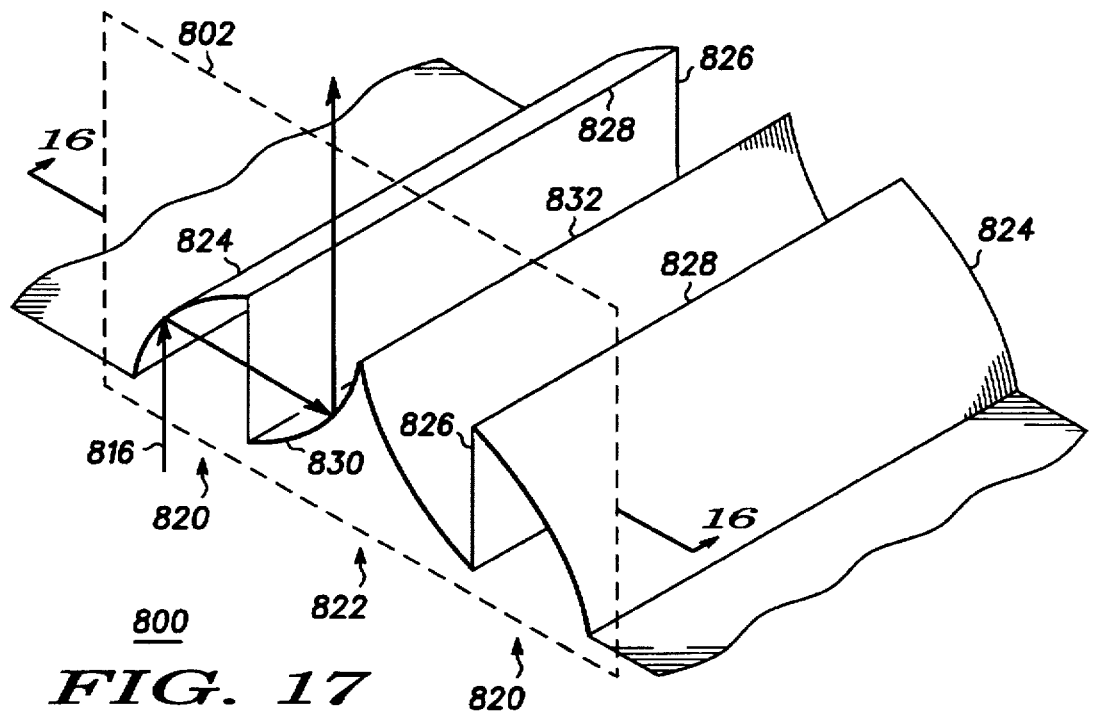
FIG. 17 is an isometric view of an embodiment of an optical correction layer having the cross-section depicted in FIG. 16, in accordance with the present invention.
Figure 18:
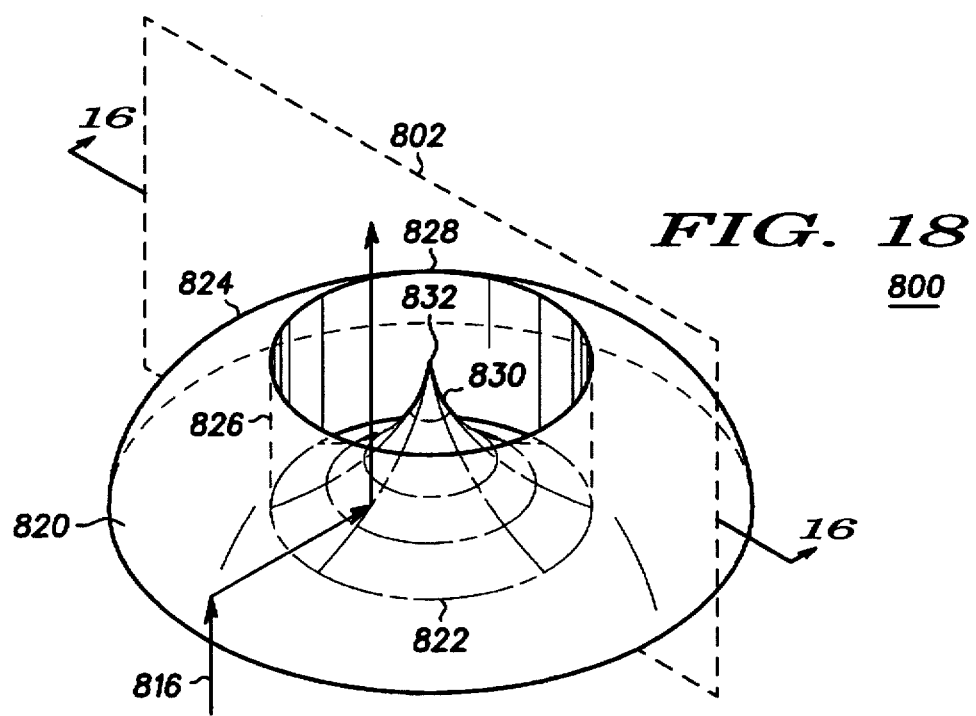
FIG. 18 is an isometric view, similar to FIG. 17, of another embodiment of an optical correction layer, the cross-section of which is depicted in FIG. 16.

Referring now to FIG. 16, there is depicted a cross-sectional view of an embodiment of optical correction layer 800 positioned in abutting engagement to faceplate 812. Illustrated in FIG. 16 is the detailed structure of optical correction region 802 delineated generally within a depicted dashed line box. In this specific embodiment, optical correction layer 800 is made from a plastic. Most of light 818 incident on the interface between faceplate 812 and the plastic of optically transparent region 804, which is delineated generally within a depicted dashed line box, is perpendicular to the interface thereby retaining its directionality. Light 818 is not redirected as it crosses the interface between faceplate 812 and layer 800. Optical correction regions 802 include at least one light-collecting groove 820 defining a central region and a central groove 822 formed within the central region so that light 816 is appropriately redirected to conceal gap 806. The cross-section depicted in FIG. 16 applies to both the elongated-strip and circular gap geometries. The distinguishing features will be illustrated and discussed in detail later (FIGS. 17, 18). With reference to a view taken along section line 1—1, groove(s) 820 include a concave, reflective surface 824 and a transparent, vertical surface 826. Surfaces 824 and 826 meet at an edge 828 within optical correction region 802, beneath outer surface 817. Central groove 822 is positioned between, or in the middle of, groove(s) 820 and generally overlaps gap 806. With reference to a cross-sectional view of FIG. 16 taken along section line 1—1, groove 822 includes at least one convex, reflective surface 830. Surface(s) 830 meet at an apex 832, including a point or line, within optical correction region 802, beneath outer surface 817. In this specific embodiment, outer surface 817 is a light-diffusing surface. In other embodiments of the present invention, outer surface 817 is not light-diffusing.

Grooves 820, 822 are formed by embossing the pattern into a plastic film by pressing the layer onto a heated, hard cylinder, the surface of which includes the complement of the groove pattern being embossed in the plastic film. The patterning structure on the cylinder is fabricated using a diamond-machined master from which thin submasters can be fabricated and attached to the cylinder. By subjecting the film to the appropriate temperature and pressure, the pattern can be repeatedly embossed onto a continous, long layer as the cylinder is rotated over the plastic layer. In this manner, optical correction layer 800 can be efficiently fabricated by continuously printing and cutting the desired display pattern. After the pieces are cut to display size, an aluminum coating is applied-by a method such as evaporation while using an appropriate shadow mask—onto the concave and convex surfaces of grooves 820 and 822, respectively, thereby forming reflective surfaces 824, 830. Optical correction layer 800 is then affixed to faceplate 812 by applying a layer of low viscosity epoxy 840 (having an index of refraction equal to, or nearly equal to, that of the plastic and that of the material of faceplate 812) to the surface of layer 800 in which grooves 820, 822 are formed. Epoxy 840 also completely fills grooves 820, 822. (For ease of understanding, one optical correction region in FIG. 16 is illustrated without epoxy 840 so that the light paths can be easily shown. In the actual embodiment, however, epoxy 840 fills all of grooves 820, 822.) Groove(s) 822 are formed to overlap light-emitting region(s) 814, which, in the application to a field emission display, include gap-adjacent phosphor dots 808 adjacent gap 806. When light 816 is emitted from gap-adjacent phosphor dots 808, light 816 traverses faceplate 812 and then passes through epoxy 840 in groove 820. The direction of light 816 is not altered because of the matching indices of refraction between faceplate 812 and epoxy 840. Light 816 is then reflected by reflective surface 824. The curvature of surface 824 is predetermined to cause light 816 to travel toward reflective surface 830. Light 816 then travels through transparent surface 826 and into the plastic matrix of layer 800. Because the index of refraction of the plastic is equal to that of epoxy 840, the direction of light 810 remains the same as it travels into the plastic. Light 816 is then reflected by reflective surface 830 and travels through the plastic matrix and outer surface 817. The curvature of reflective surface(s) 830 is predetermined to spread light 816 over the portion of outer surface 817 directly opposed to gap 806 and over portions of light-emitting region 814. One of the advantages of utilizing reflective surfaces 824, 830 is that the angle of reflection is independent of the wavelength of the incident light, or, equivalently, there is no dispersion. So, this specific embodiment can be applied to a polychromatic display.

The two embodiments of optical correction layer 800, the cross-sections of which are identical and depicted in FIG. 16, are distinguished in FIGS. 17 and 18.

Referring now to FIG. 17, there is depicted an isometric view of an embodiment of optical correction layer 800 in accordance with the present invention. The cross-section of this embodiment, taken along the line 16—16, is described in detail in the description of FIG. 16. Illustrated in FIG. 17 is optical correction region 802, delineated generally within a depicted dashed line box, including grooves 820, 822. This specific embodiment is made for application to elongated gaps 206 (FIGS. 1, 4, 10), such as those resulting from spacers 102 including elongated bars. In order to overlap elongated gaps 206, grooves 820, 822 include elongated troughs formed across a surface of optical correction layer 800. The elongated troughs define a rectangular central region. Also, in this specific application, gap-adjacent phosphor dots 808 form a row on either side of spacer 102. In order to overlap these two rows, two elongated grooves 820 are included. Groove 822 is formed within the rectangular central region and includes two opposing surfaces 830 which meet at line 832. The reflection of light 816 from surfaces 824, 830 is also indicated.

Referring now to FIG. 18, there is depicted an isometric view of another embodiment of optical correction layer 800 in accordance with the present invention. The cross-section of this embodiment, taken along the line 16—16, is described in detail in the description of FIG. 16. Illustrated in FIG. 18 is optical correction region 802, delineated generally within a depicted dashed line box, including grooves 820, 822. This specific embodiment is made for application to circular gaps 206 (FIGS. 13, 14, 15), such as those resulting from spacers 102 including posts having circular cross-sections. In order to overlap circular gaps 206, groove 822 includes a circular trough formed in a surface of optical correction layer 800. The circular trough defines a circular central region. Groove 822 is formed in the circular central region and includes one surface 830 which meets at point 832. In this specific application, gap-adjacent phosphor dots 808 form a circle surrounding spacer 102. In order to overlap this circle of phosphor dots, cirular groove 820 is formed around groove 822. Concave, reflective surface 824 meets vertical, transparent surface 826 at line 828. The reflection of light 816 from surfaces 824, 830 is also indicated by arrows in FIG. 18.

Figure 19:
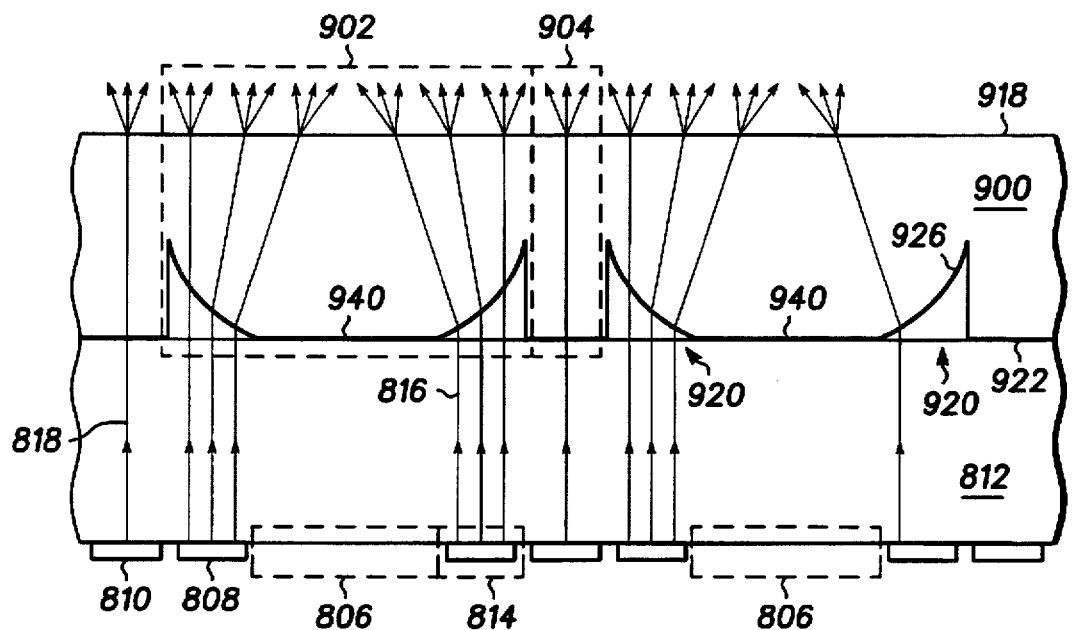
FIG. 19 is a cross-sectional view, similar to FIG. 16, of an optical correction layer, illustrating the detailed structure and application to the faceplate of a field emission display.

Referring now to FIG. 19, there is depicted a cross-sectional view of another embodiment of an optical correction layer 50 positioned in abutting engagement with faceplate 812. Illustrated in FIG. 19 is the detailed structure of an optical correction region 902 delineated generally within a depicted dashed line box. Optical correction regions 902 include at least one light-refracting groove 920 formed so that light 816 is appropriately redirected to conceal gap 806. Optical correction layer 900 is affixed to faceplate 812 by applying a thin layer of an adhesive 940, such as a high viscosity epoxy, to the surface of faceplate 812 and then placing optical correction layer 900 in physical contact with adhesive 940 so that adhesive 940 contacts the flat surfaces of an inner surface 922 in which grooves 920 are formed, without filling light-collecting grooves 920. Adhesive 940 has a high viscosity in order to prevent filling light-collecting grooves 920. Adhesive 940 can be patterned on the surface of faceplate 812 so that it does not fill grooves 920. In this specific embodiment, optical correction layer 900 is made from a plastic having an index of refraction which is close to that of adhesive 940. Grooves 920 are filled with air, which has an index of refraction of about 1. When collected light 816 enters groove 920, its directionality is unchanged because the majority of light 816 incident on the interface between faceplate 812 and groove 920 is perpendicular to the interface. Light 816 is bent, or refracted, when it travels through an optically transparent surface 926 between air-filled groove 920 and the plastic bulk, which has an index of refraction greater than one. Surface 926 is convex to the incident light. The curvature of surface 926 is predetermined to spread light 816 substantially uniformly over that portion of an outer surface 918 which overlays gap-adjacent phosphor dots 808 and gap 806. In this specific embodiment, outer surface 918 is a light-diffusing surface. In other embodiments of the present invention outer surface 918 includes a surface which is not light-diffusing. If optical correction layer 900 is applied to a polychromatic display, the curvature of surfaces 926 is also determined by the wavelength of light being refracted.

An optically transparent region 904 is located between regions 902, and is delineated generally within a depicted dashed line box. Because most of the light incident on inner surface 922 is traveling perpendicular to inner surface 922, light 818 travels through inner surface 922, retaining its directionality, despite any difference in the indices of refraction of faceplate 812 and the bulk plastic of layer 900.

The cross-section depicted in FIG. 19 applies to both the elongated-strip and circular gap geometries, in a manner analogous to FIG. 16 and FIGS. 17, 18. That is, grooves 920 can, in the elongated-strip geometry, include elongated troughs or grooves, each region 920 having a pair of grooves 920. In the circular gap geometry, grooves 920 can include a circular trough or groove which is centered over gap 806 and has one continuous surface 926.

Grooves 920 are formed by embossing the pattern into a plastic film by pressing the layer onto a heated, hard cylinder, the surface of which includes the complement of the groove pattern being embossed in the plastic film. The patterning structure on the cylinder is fabricated using a diamond-machined master from which thin submasters can be fabricated and attached to the cylinder. By subjecting the film to the appropriate temperature and pressure, the pattern can be repeatedly embossed onto a continous, long layer as the cylinder is rotated over the plastic layer. In this manner, optical correction layer 900 can be efficiently fabricated by continuously printing and cutting the desired pattern. Groove(s) 920 are formed so that they overlap light-emitting region(s) 814, which, in the application to a field emission display, include gap-adjacent phosphor dots 808 adjacent gap 806. When light 816 is emitted from gap-adjacent phosphor dots 808, light 816 traverses faceplate 812 and then passes through epoxy 840 in groove 820.

Figure 20:
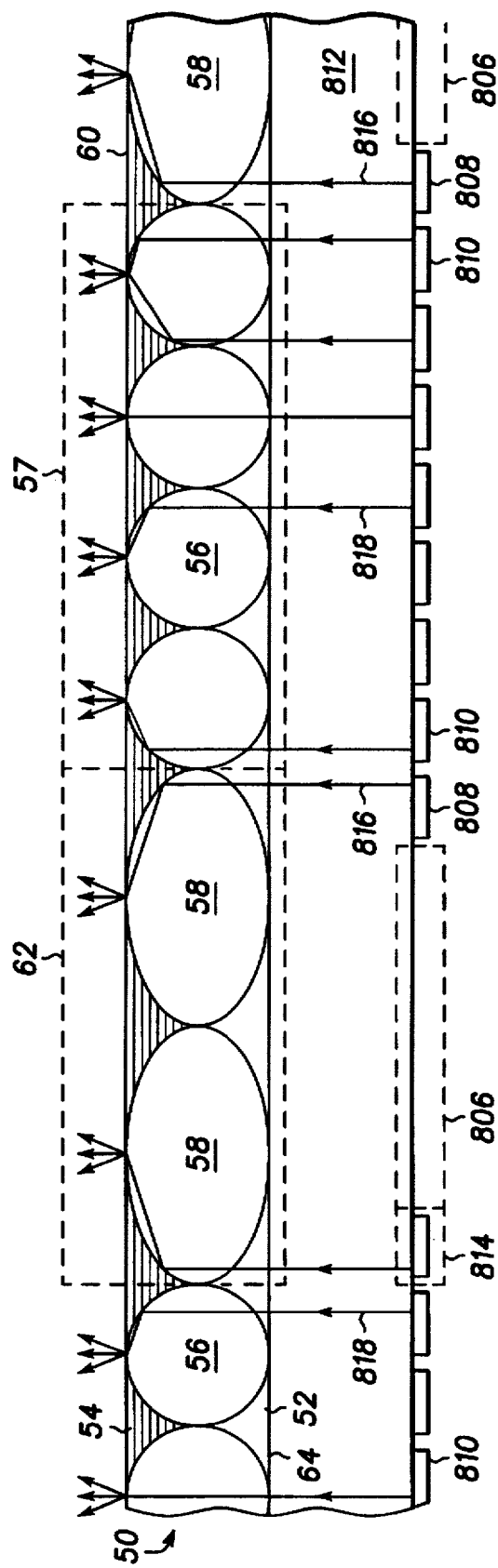
FIG. 20 is a cross-sectional view, similar to FIGS. 16 and 19, of another embodiment of an optical correction layer in accordance with the present invention.

Referring now to FIG. 20 there is depicted a cross-sectional view of another embodiment of an optical correction layer 50 affixed to faceplate 812. Optical correction layer 50 includes an epoxy matrix which includes a transparent, inner sublayer 52 and a blackened, or dyed, outer sublayer 54. Outer sublayer 54 overlays transparent, inner sublayer 52. A plurality of transparent spherical structures 56 are embedded in the epoxy matrix to define a plurality of optically transparent regions 57. Optically transparent regions 57 are directly opposed to phosphor dots 810. Spherical structures 56 form a monolayer of spheres, adjacent spheres contacting one another at a point. The thickness of layer 50 is equal to the diameter of spheres 56 so that substantially one point of each sphere 56 is exposed at an outer surface 60 of sublayer 54. Spherical structures 56 are formed from a transparent material, such as glass. When light 818 is emitted from phosphor dots 810, it travels through faceplate 812 and through transparent sublayer 52 and/or through spherical structures 56. Light 818 exits optical correction layer 50 at the regions where spherical structures 56 contact outer surface 60. Light cannot travel through blackened sublayer 54. A plurality of optically transparent ellipsoidal structures 58 are embedded in the epoxy matrix—in a manner similar to spherical structures 56—to define an optical correction region 62 of optical correction layer 50. Adjacent ellipsoidal structures 58 physically contact one another at a point equal to an endpoint of the major axis of the ellipsoid. Ellipsoidal structures 58 have a minor axis extending across the thickness of optical correction region 62. The minor axis has a length substantially equal to the diameter of spherical structures 56 so that layer 50 has a substantially uniform thickness. In each optical correction region 62, a portion of ellipsoidal structures 58 are disposed opposite light-emitting regions 814 and the remaining portions are disposed opposite gap 806. In a field emission display, light-emitting regions 814 include gap-adjacent phosphor dots 808, which are adjacent gap 806. Light 816 from dots 808 travels through faceplate 812 and then through transparent sublayer 52 and/or ellipsoidal structures 58. Light 816 exits optical correction layer 50 at the regions where ellipsoidal structures 58 contact outer surface 60. The point at which light 816 exits ellipsoidal structure 58 is located above gap 806 thus effectively redirecting light 816 over gap 806 and providing a more uniform distribution of light over surface 60. Optical correction layer 50 is affixed to faceplate 812 by applying a thin layer 64 of an adhesive, such as epoxy, between optical correction layer 50 and faceplate 812.

Figure 21:
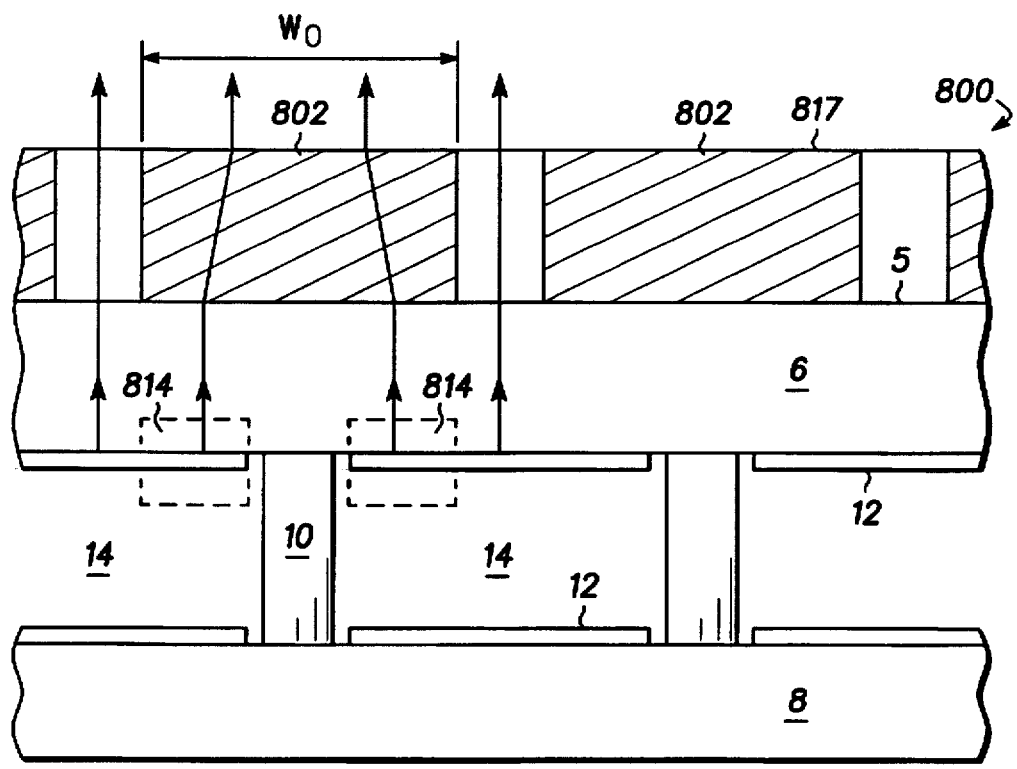
FIG. 21 is a sectional view of a flat fluorescent lamp with an optical correction layer affixed thereon in accordance with the present invention.

Referring now to FIG. 21 there is depicted a sectional view, similar to FIG. 9, of a flat fluorescent lamp 4 with optical correction layer 800 affixed thereon. Flat fluorescent lamp 4 is suitable for use as a back light of a liquid crystal panel in a liquid crystal display. Lamp 4 has an outer, light-emitting surface 5 upon which optical correction layer 800 is affixed by applying an adhesive, such as an epoxy, to the appropriate planar surface of layer 800 and then placing the epoxied, planar surface of layer 800 in abutting engagement with light-emitting surface 5. Outer surface 817 of layer 800 is disposed in intimate contact with the rear side of a liquid crystal panel (not shown), the entire structure of FIG. 21 serving as a back light for the panel. The operation and detailed description of this particular type of light-emitting apparatus, flat fluorescent lamp 4, is taught in U.S. Pat. No. 4,920,298 by Hinotani et al, issued Apr. 24, 1990. An upper glass plate 6 and a lower glass plate 8 are coated, on their inner surfaces, with a fluorescent film 12. At least one spacer 10 has a height approximately equal to the distance between upper and lower glass plates 6, 8. Each spacer 10 has upper and lower edges in contact with upper and lower faces 6, 8 to support plates 6, 8, which are thereby prevented from implosion against atmospheric pressure in spite of a high vacuum of a discharge space 14. As taught in Hinotani et al, it is necessary to uniformly illuminate the liquid crystal panel from behind. However, brightness irregularities result from the incorporation of spacers 10. Additionally, spacers 10 are often made of glass which exhibits UV transmittance appreciably less than 100% and light transmittance which produces color modulation to green. These problems can be substantially solved by providing optical correction layer 800. Optical correction regions 802 are substantially centered over spacers 10 so that each optical correction region 802 has a width, $w_o$, substantially equal to the sum of the widths of spacer 10, the tolerance gaps on either side of spacer 10, and light-emitting regions 814 on either side of spacer 10. In this particular application, light-emitting regions 814 include a predetermined segment of fluorescent film 12. The width of the segment of fluorescent film 12 comprising region 814 is chosen so that the uniformity of light over outer surface 817 is optimized and depends, in part, on the width of spacer 10. To eliminate the problem due to color modulation to green, spacers 10 can be coated with an opaque coating so that spacers 10 do not transmit light. Alternatively, spacers 10 can be made of ceramic to provide a highly electrically resistive material which does not transmit light.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An optical correction layer for concealing a gap in brightness at a light-emitting surface of a faceplate of a light-emitting apparatus having light-emitting regions adjacent the gap, the optical correction layer comprising:

an optical correction region having a first height and having a width equal to the sum of the width of the gap and the widths of light-emitting regions adjacent the gap so that, when the optical correction region is substantially centered over the gap, the optical correction region opposes the gap and the light-emitting regions adjacent the gap;

means being disposed within the optical correction region for redirecting light so that the light-redirecting means receives and redirects the light emitted from the light-emitting regions to substantially cover and conceal the gap; and a plurality of optically transparent regions having a second height substantially equal to the first height of the optical correction region, the optical correction region being positioned between the plurality of optically transparent regions so as to form a continuous layer of substantially uniform height, the continuous layer having first and second opposed, planar surfaces, the first planar surface including an outer surface, the second planar surface being designed to be affixed to the light-emitting surface of the light-emitting apparatus so that the optical correction region is substantially centered over the gap in brightness, whereby the optical correction layer provides substantially uniform brightness over the light-emitting apparatus and substantially conceals the gap in brightness.

2. An optical correction layer as claimed in claim 1 wherein said continuous layer is made of plastic.

3. An optical correction layer as claimed in claim 2 wherein said light-redirecting means includes a light-collecting groove formed in the second planar surface of said plastic, continuous layer and defining a central region, said light-collecting groove having a first concave, reflective surface and a second transparent surface, said first concave, reflective surface and said second transparent surface meeting at a vertex, the light-collecting groove being disposed opposite the light-emitting regions adjacent the gap so that the first reflective surface receives light from the light-emitting regions and reflects the light to travel through the second transparent surface; and further includes a central groove formed in the second planar surface of said continuous layer, the central groove being position in the central region defined by the light-collecting groove, the central groove having a convex, reflective surface forming an apex positioned substantially opposite the center of the gap, the convex, reflective surface being positioned to receive the light reflected by the light-collecting groove and having a predetermined curvature so that the light is reflected and redirected to substantially cover and conceal the gap in brightness.

4. An optical correction layer as claimed in claim 3 wherein the outer surface of said continuous layer includes a light-diffusing surface.

5. An optical correction layer as claimed in claim 3 wherein said first concave, reflective surface includes a thin coating of aluminum and wherein the convex, reflective surface includes a thin coating of aluminum.

6. An optical correction layer as claimed in claim 3 wherein the light-collecting groove includes a circular trough defining a circular central region and encircling said central groove and wherein said central groove includes one continuous surface.

7. An optical correction layer as claimed in claim 3 wherein the light-collecting groove includes a pair of elongated troughs defining a rectangular central region.

8. An optical correction layer as claimed in claim 3 wherein the second planar surface is affixed to the light-emitting surface of the light-emitting apparatus by applying a thin layer of an adhesive to the second planar surface so that the adhesive fills the light-collecting groove and the central groove.

9. An optical correction layer as claimed in claim 8 wherein the adhesive includes a low viscosity epoxy.

10. An optical correction layer as claimed in claim 8 wherein the adhesive has an index of refraction equal to the indices of refraction of the plastic and the faceplate.

11. An optical correction layer as claimed in claim 1 wherein the continuous layer includes a matrix having a transparent inner sublayer and an optically opaque outer sublayer overlying the transparent inner sublayer;

a plurality of optically transparent spherical structures embedded in the matrix to define the optically transparent regions of the optical correction layer, the spherical structures forming a monolayer of spheres so that adjacent spherical structures physically contact one another substantially at a point, the optical correction layer having a thickness equal to the diameter of the plurality of spherical structures so that substantially one point of each spherical structure is exposed at the outer surface of the optical correction layer; and a plurality of optically transparent ellipsoidal structures embedded in the matrix to define the optical correction regions and comprising the light-redirecting means, the ellipsoidal structures forming a monolayer such that adjacent ellipsoidal structures physically contact one another at substantially a point located substantially at an endpoint of the major axis of the ellipsoidal structure, the plurality of ellipsoidal structures having a minor axis extending across the thickness of the optical correction region, the minor axis having a length equal to the diameter of the plurality of spherical structures so that substantially one point of each ellipsoidal structure is exposed at the outer surface of the optical correction layer, the exposed, substantially one point of the plurality of ellipsoidal structures being disposed opposite the gap in brightness, portions of the plurality of ellipsoidal structures being disposed opposite the light-emitting regions of the light-emitting apparatus to receive light from the light-emitting regions, wherein the light entering the plurality of ellipsoidal structures exits only at the exposed, substantially one point of the plurality of ellipsoidal structures, said exposed, substantially one point of the plurality of ellipsoidal structures being positioned opposite the gap in brightness of the light-emitting apparatus thereby concealing the gap.

12. An optical correction layer as claimed in claim 10 wherein the transparent inner sublayer is made of an optically transparent epoxy and the optically opaque outer sublayer is made of an epoxy having a black color.

13. An optical correction layer as claimed in claim 2 wherein said light-redirecting means includes a light-refracting groove formed in the second planar surface of said plastic, continuous layer, the light-refracting groove having a convex, optically transparent surface, the light-refracting groove being disposed opposite the light-emitting regions adjacent the gap so that the convex, optically transparent surface receives light from the light-emitting regions; and further including a thin layer of an adhesive being disposed between the light-emitting surface of the faceplate and the second planar surface of said plastic, continuous layer so that said plastic, continuous layer is affixed to the faceplate and so that the light-refracting groove is filled with air, the convex surface having predetermined curvature so that the refracted light is spread substantially uniformly over the first planar surface of the optical correction layer thereby concealing the gap in brightness.

14. An optical correction layer as claimed in claim 13 wherein the outer surface of said continuous layer includes a light-diffusing surface.

15. An optical correction layer as claimed in claim 13 wherein the light-refracting groove includes a circular trough.

16. An optical correction layer as claimed in claim 13 wherein the light-refracting groove includes a pair of elongated troughs.

17. An optical correction layer as claimed in claim 13 wherein the adhesive includes a high viscosity epoxy.

18. A field emission display comprising:

a cathode structure having field emitters for emitting electrons;

a faceplate positioned to receive the emitted electrons including a first light-emitting surface and a second surface opposed to the first surface, the second surface containing a plurality of phosphor dots;

a spacer disposed between the cathode structure and the faceplate for providing structural support to prevent the collapse of the field emission display, the spacer having first and second opposed edges, the first edge positioned in abutting engagement with the cathode structure, the second edge positioned in abutting engagement with the faceplate wherein the spacer forms a gap in brightness at the light-emitting surface of the faceplate;

a plurality of light-emitting regions including a plurality of gap-adjacent phosphor dots being positioned adjacent the spacer whereby the plurality of light-emitting regions provide light which is redirected to cover the gap; and an optical correction layer being disposed parallel to the first light-emitting surface of the faceplate and affixed to the light-emitting surface of the faceplate, the optical correction layer comprising a optical correction region having a first height and having a width equal to the sum of the width of the spacer and the widths of the plurality of light-emitting regions adjacent the spacer so that, when the optical correction region is substantially centered over the spacer, the optical correction region opposes the spacer and the plurality of light-emitting regions adjacent the spacer;

means being disposed within the optical correction region for redirecting light; and a plurality of optically transparent regions having a second height substantially equal to the first height of the optical correction region, the optical correction region being disposed between the plurality of optically transparent regions so as to form a continuous layer of substantially uniform height, the continuous layer having first and second opposed, planar surfaces, the first planar surface including an outer surface, the second planar surface being affixed to the first light-emitting surface of the faceplate so that the optical correction region is substantially centered over the spacer, whereby the optical correction layer provides substantially uniform brightness over the field emission display and substantially conceals the gap in brightness.

19. A field emission display as claimed in claim 18 wherein the spacer includes an elongated bar.

20. A field emission display as claimed in claim 18 wherein the spacer includes a post having opposed ends and wherein the opposed edges of the spacer include the opposed ends of the post.

21. A large-screen field emission display comprising: a plurality of cathode structures having field emitters for emitting electrons and having a plurality of handling edges disposed along the perimeters of the plurality of cathode structures;

a backplate, the plurality of cathode structures being tiled together upon the backplate forming a tolerance gap between the plurality of cathode structures so that the tolerance gap and the plurality of handling edges form a tiling gap in the visual image of the large-screen field emission display;

a faceplate disposed opposite the plurality of cathode structures and positioned to receive the electrons emitted by the plurality of cathode structures, the faceplate including a first light-emitting surface and a second surface opposed to the first surface, the second surface containing a plurality of phosphor dots being disposed to receive electrons and emit light to form a visual image at the first light-emitting surface of the faceplate;

a spacer having first and second opposed edges for providing structural support to prevent the collapse of the large-screen field emission display, the spacer being disposed between the plurality of cathode structures and the faceplate so that the first opposed edge is in abutting engagement with the plurality of cathode structures and the second opposed edge is in abutting engagement with the faceplate;

a plurality of light-emitting regions disposed on the second surface of the faceplate adjacent the tiling gap whereby the plurality of light-emitting regions substantially provide the light which is redirected to conceal the tiling gap; and an optical correction layer affixed to the first light-emitting surface of the faceplate, the optical correction layer comprising an optical correction region having a first height and having a width equal to the sum of the width of the tiling gap and the widths of the plurality of light-emitting regions adjacent the tiling gap so that, when the optical correction region is substantially centered over the tiling gap, the optical correction region opposes the tiling gap and the plurality of light-emitting regions adjacent the tiling gap;

means being disposed within the optical correction region for receiving and redirecting the light emitted from the light-emitting regions so as to substantially cover and conceal the tiling gap; and a plurality of optically transparent regions having a second height substantially equal to the first height of the optical correction region, the optical correction region being disposed between the plurality of optically transparent regions so as to form a continuous layer of substantially uniform height, the continuous layer having first and second opposed, planar surfaces, the first planar surface including an outer surface, the second planar surface being affixed to the first light-emitting surface of the faceplate so that the correction region is substantially centered over the tiling gap, whereby the optical correction layer provides substantially uniform brightness over the large-screen field emission display and substantially conceals the gap in brightness at the outer surface of the optical correction layer.

22. A large-screen field emission display as claimed in claim 21 wherein the plurality of light-emitting regions includes a plurality of gap-adjacent phosphor dots.

23. A flat fluorescent lamp suitable for use as a back light of a liquid crystal panel for use in a display device, the flat fluorescent lamp comprising:

a lower glass plate coated with a fluorescent film on an inner surface thereof;

an upper glass plate coated with a fluorescent film on an inner surface thereof and having an outer, light-emitting surface, the upper glass plate disposed above the lower glass plate;

a glass side wall disposed along peripheral edges of the upper and lower glass plates and having upper and lower end faces thereof hermetically joined to the peripheral edges of the glass plates to form a hermetic discharge space between the upper and lower glass plates;

a pair of discharge electrodes arranged in parallel within the discharge space and opposed to each other;

a spacer disposed between the electrodes and for supporting the upper and lower glass plates, the spacer having a height approximately equal to the distance between the upper and lower glass plates, wherein an inner surface of the upper glass plate has an uncoated portion having no fluorescent film at a position where the spacer is in contact with the inner surface and further wherein the inner surface of the lower glass plate has an uncoated portion without any fluorescent film at a position where the spacer is in contact with the inner surface so that the spacer forms a gap in brightness at the outer, light-emitting surface of the upper glass plate;

a plurality of light-emitting regions including a plurality of segments of the fluorescent film disposed on the inner surface of the upper glass plate, the segments being adjacent the spacer whereby the plurality of light-emitting regions provide the light which is redirected to conceal the gap in brightness;

an optical correction layer being disposed parallel to the outer, light-emitting surface of the upper glass plate and further being affixed to the outer, light-emitting surface of the upper glass plate, the optical correction layer comprising an optical correction region having a first height and having a width equal to the sum of the width of the spacer and the widths of the plurality of light-emitting regions adjacent the spacer so that, when the optical correction region is substantially centered over the spacer, the optical correction region opposes the spacer and the plurality of light-emitting regions adjacent the spacer;

means being disposed within the optical correction region for receiving and redirecting light emitted from the light-emitting regions wherein the redirected light substantially conceals the gap; and a plurality of optically transparent regions having a second height substantially equal to the first height of the optical correction region, the optical correction regions being disposed between the plurality of optically transparent regions so as to form a continuous layer of substantially uniform height, the continuous layer having first and second opposed, planar surfaces, the first planar surface including an outer surface, the second planar surface being affixed to the outer, light-emitting surface of the upper glass plate so that the optical correction region is substantially centered over the spacer, whereby the optical correction layer provides substantially uniform brightness over the flat fluorescent lamp and substantially conceals the gap in brightness at the outer surface of the optical correction layer.

24. A flat fluorescent lamp as claimed in claim 23 wherein the spacer is made of ceramic.

25. A flat fluorescent lamp as claimed in claim 23 wherein the spacer includes an opaque coating disposed thereon so that the spacer does not transmit light.

26. A method for fabricating an optical correction layer for concealing a gap in brightness at a light-emitting surface of a faceplate of a light-emitting apparatus having light-emitting regions adjacent the gap, the method comprising the steps of:

providing an optical correction region so that when the optical correction region is substantially centered over the gap, the optical correction region opposes the gap and the light-emitting regions adjacent the gap;

providing within the optical correction region means for redirecting light so that the light emitted by said light-emitting regions is received and redirected by the light-redirecting means to substantially cover the gap;

providing a plurality of optically transparent regions;

positioning the optical correction region between the plurality of optically transparent regions so that a continuous layer of substantially uniform height is provided having first and second opposed, planar surfaces;

whereby, upon affixing the second planar surface to the light-emitting surface of the light-emitting apparatus, the plurality of optical correction regions are substantially centered over the gaps in brightness.

27. A method for fabricating an optical correction layer as claimed in claim 26 wherein the steps of providing an optical correction region and providing a plurality of optically transparent regions include providing a layer of plastic;

wherein the step of providing light-redirecting means within the optical correction region includes forming a light-collecting groove in the second planar surface of the layer of plastic so that the light-collecting groove has a first concave, reflective surface and a second transparent surface and so that the first concave, reflective surface and the second transparent surface meet at a vertex, the step of providing the light-redirecting means and further includes positioning the light-collecting groove so that it is disposed opposite the light-emitting regions adjacent the gap and positioning the first reflective surface to receive light from the light-emitting regions and to reflect the light to travel through the second transparent surface, the step of providing light-redirecting means further including forming a central groove in the second planar surface of said continuous layer so that the central groove has a convex, reflective surface having an apex positioned substantially opposite the center of the gap in brightness, the step of forming the central groove further includes positioning the convex, reflective surface to receive the light reflected by the light-collecting groove and providing a curvature of the convex surface so that the light is reflected and redirected to substantially cover and conceal the gap in brightness.

28. A method for fabricating an optical correction layer as claimed in claim 27 wherein the step of providing light-redirecting means further includes applying a thin layer of an adhesive to the second planar surface so that the adhesive completely fills the light-collecting groove and the central groove whereby the optical correction layer is affixed to the light-emitting surface of the light-emitting apparatus by positioning the thin layer of adhesive in abutting engagement with the light-emitting surface of the light-emitting apparatus.

29. A method for fabricating an optical correction layer as claimed in claim 28 wherein the step of applying a thin layer of an adhesive includes applying a thin layer of a low viscosity epoxy.

30. A method for fabricating an optical correction layer as claimed in claim 27 wherein the steps of forming a light-collecting groove and forming a central groove include:

providing a hard surface;

forming the complement of the desired groove pattern on the hard surface;

pressing the plastic layer onto the hard surface under predetermined conditions of temperature and pressure, thereby embossing the desired groove pattern into the plastic layer; and applying a reflective coating onto the concave surface of the light-collecting groove and onto the convex surface of the central groove.

31. A method for fabricating an optical correction layer as claimed in claim 30 wherein the step of applying a reflective coating includes applying an aluminum coating onto the concave surface of the light-collecting groove and onto the convex surface of the central groove.

32. A method for fabricating an optical correction layer as claimed in claim 26 wherein the steps of providing a plurality of optical correction regions and providing a plurality of optically transparent regions include providing a layer of plastic; and wherein the step of providing light-redirecting means within the optical correction region includes forming a light-refracting groove in the second planar surface of the layer of plastic so that the light-refracting groove has a convex, optically transparent surface having a predetermined curvature, the step of forming a light-refracting groove further includes positioning the light-refracting groove opposite the light-emitting regions adjacent the gap so that the convex, optically transparent surface receives light from the light-emitting regions, the step of providing light-redirecting means further including applying a thin layer of an adhesive to the light-emitting surface of the faceplate and then placing the optical correction layer in physical contact with the adhesive so that the adhesive contacts the flat surfaces of the second planar surface of the layer of plastic and so that the light-refracting groove is filled with air, the step of forming a light-refracting groove further includes providing a curvature of the convex surface so that the light refracted at the convex surface spreads substantially uniformly over the first planar surface of the optical correction layer thereby concealing the gaps in brightness.

33. A method for fabricating an optical correction layer as claimed in claim 32 wherein the step of applying a thin layer of an adhesive includes applying a thin layer of a high viscosity epoxy.

34. A method for fabricating an optical correction layer as claimed in claims 32 wherein the step of forming a light-refracting groove includes providing a hard surface;

forming the complement of the desired groove pattern on the hard surface; and pressing the plastic layer onto the hard surface under predetermined conditions of temperature and pressure, thereby embossing the desired groove pattern into the plastic layer.

* * * * *